US005351550A

United States Patent [19]

Maurer

[11] Patent Number: 5,351,550
[45] Date of Patent: Oct. 4, 1994

[54] PRESSURE SENSOR ADAPTED FOR USE WITH A COMPONENT CARRIER

[75] Inventor: Dean J. Maurer, Galena, Ill.

[73] Assignee: Honeywell Inc., Minneapolis, Minn.

[21] Appl. No.: 962,641

[22] Filed: Oct. 16, 1992

[51] Int. Cl.$^5$ .............................. G01L 7/08; G01L 9/06
[52] U.S. Cl. ........................................ 73/727; 29/621.1;
    73/720; 73/721; 73/726; 73/756; 338/4
[58] Field of Search .................. 73/720, 721, 726, 727,
    73/718, 724, 754, 753, 756, 708, 706, 722,
    862.627, 862.628, 862.629, 862.636; 338/4, 42,
    36; 29/595, 621.1

[56] References Cited

U.S. PATENT DOCUMENTS

| | | | |
|---|---|---|---|
| 4,609,966 | 9/1986 | Kuisma | 73/724 |
| 4,612,599 | 9/1986 | Ziegler | 73/724 |
| 4,656,454 | 4/1987 | Rosenberger | 338/2 |
| 4,721,938 | 1/1988 | Stevenson | 338/4 |
| 4,876,893 | 10/1989 | Kato et al. | 73/726 |
| 4,889,590 | 12/1989 | Tucker et al. | 156/647 |
| 4,895,026 | 1/1990 | Tada | 73/721 |
| 5,081,867 | 1/1992 | Yamada | 73/517 R |
| 5,184,107 | 2/1993 | Maurer | 73/727 |

Primary Examiner—Donald O. Woodiel
Attorney, Agent, or Firm—William D. Lanyi

[57] ABSTRACT

A pressure transducer is provided with a housing member that attaches to a rigid and generally planar member, such as a ceramic circuit board. The legs of the housing member can pass through holes in the circuit board or, alternatively, can attach to edges thereof. The legs of the housing are provided with bails which have steps shaped to seize the circuit board after the legs are flexed to permit insertion of the board between them. The housing is provided with an opening that is shaped to receive a media seal, a pressure sensor die and a conductive seal between a surface of the opening and a surface of the ceramic circuit board. When the circuit board is attached to the housing, the seals and the pressure sensor die are compressed therebetween to provide good fluid sealing association between the components and to also provide electrical communication between components on the pressure sensor die and components on the circuit board. An alternative embodiment of the present invention comprises two housing members that are attached to opposite sides of the same circuit board so that a differential pressure can be measured.

17 Claims, 5 Drawing Sheets

PRESSURE SENSOR ADAPTED FOR USE WITH A COMPONENT CARRIER

BACKGROUND OF THE INVENTION

1. Field of the Invention

The present invention is generally related to pressure sensors and, more specifically, to a pressure sensor that is particularly adapted to be used in association with a component carrier such as a printed circuit board or a generally planar ceramic member.

2. Description of the Prior Art

Pressure sensors of many different types are well known to those skilled in the art. Some types of pressure sensors incorporate silicon components that are micromachined to form a diaphragm on which one or more piezoresistors can be disposed. When the diaphragm moves in response to changes in pressure imposed on it, the piezoresistors experience stress and a corresponding change in resistance. The piezoresistors can be disposed in an appropriate bridge circuit arrangement to respond to movement of the diaphragm and provide an analog signal that is representative of the pressure imposed thereon.

U.S. Pat. No. 4,895,026, which issued to Tada on Jan. 23, 1990, discloses a semiconductor pressure sensor that comprises first and second pressure sensing diaphragms which each have first and second pressure receiving surfaces. The diaphragms are supported in a common plane in the same orientation. Two pressure sensing diaphragms are connected to similar bridge circuits made of piezoelectric elements for generating electrical signals indicative of the fluid pressure acting on the pressure sensing diaphragms. A first fluid passage is connected to a first pressure source and is disposed in fluid communication with the first pressure receiving surface of the first diaphragm. Similarly, the second pressure receiving surface of the second diaphragm is connected in fluid communication with a second fluid passage. The two electrical signals are supplied to a differential amplifier where the two signals are subtracted from each other and an output signal proportional to the magnitude of the difference is provided.

U.S. Pat. No. 4,656,454, which issued to Rosenberger on Apr. 7, 1987, discloses a piezoresistive pressure transducer that uses elastomeric seals. The low cost pressure transducer utilizes premolded elastomeric seals and is particularly adapted for automatic assembly. The stress sensitive element of the transducer is in the form of a diaphragm of semiconductive material that has a thickened rim. The semiconductive material is held at its rim between a pair of premolded elastomeric seals in a thermoplastic housing. Electrical connections with external circuitry are made with strain relief jumpers that connect conductive regions on the pressure sensitive element outside the seals to conductors which pass through the housing wall.

U.S. Pat. No. 4,889,590, which issued to Tucker et al on Dec. 26, 1989, describes a piezoresistive pressure sensor element that is formed in the front face of a silicon wafer. A thin diaphragm is formed under the sensing element by anisotropically etching a cavity from the rear face of the wafer. The rear face rupture pressure of the silicon diaphragm is at least doubled by subjecting the anisotropically etched cavity to a mild isotropic etch. This substantially improves the cavity side overpressure rating of the finished pressure sensor without any significant change in the device sensitivity.

U.S. Pat. No. 4,876,893, which issued to Kato et al on Oct. 31, 1989, discloses a strain gage for a pressure sensor which is made of an amorphous alloy including Ni, Cr and Si. The alloy has a high crystallization point and its temperature coefficient of resistance is almost zero. The alloy is a nonmagnetic substance and the strain gage produced with it is not substantially affected by external electromagnetic noise.

U.S. Pat. No. 4,721,938, which issued to Stevenson on Jan. 26, 1988, describes a process for forming a silicon pressure transducer. The transducer is formed in a silicon layer which has been grown over a monocrystalline silicon substrate. A central portion of the substrate had been earlier coated with a silicon dioxide layer having a plurality of apertures under each of which had been formed a heavily doped etched resistant region. The substrate is etched to remove its central portion under the silicon dioxide and the heavily doped regions to leave a thick surrounding portion to provide support. Resistors are formed in the monocrystalline portions of the grown layer overlying the heavily doped regions.

U.S. Pat. No. 5,081,867 which issued to Yamada on Jan. 21, 1992, discloses a semiconductor sensor that comprises a sensor member on a support member. The sensor member has a base portion and a rim portion connected to each other by a beam portion. The base portion is fixed to the support member and the rim portion is held by the beam portion such that the rim portion is spaced apart from the base portion and the support portion. The beam portion is provided with a resistor to detect the changes of resistance values of the resistor due to mechanical stress caused at the beam portion.

U.S. patent application Ser. No. 07/826,206, which was filed on Jan. 24, 1992 by Maurer and assigned to the Assignee of the present application, discloses a pressure transducer that provides a significant advantage by using elastomeric members that are selectively conductive. A pressure transducer is disposed between a selectively conductive elastomeric device and another resilient sealing member with a compressive force provided by two housing members. The selectively conductive elastomeric member provides electrical communication between components of the silicon pressure transducer and other electrically conductive components of the pressure sensor. The cooperation between the pressure sensor, which comprises a silicon diaphragm member, and the selectively conductive elastomeric member significantly decreases the cost of manufacture of the pressure transducer and improves its reliability.

U.S. Pat. No. 3,968,466, which issued to Nakamura et al on Jul. 6, 1976, discloses a transducer that includes a semiconductor diaphragm of a predetermined conductivity having a strain sensitive region capable of being elastically deformed by means of the external pressure applied thereto. The pressure transducer also comprises a fixing region having a high degree of rigidity, central and peripheral strain sensitive elements disposed along the crystallographic directions thereof and exhibiting high sensitivity. The pressure transducer transmits the electrical signals detected by strain sensitive elements to electrodes by means of lead portions and, in turn, conducts the electrical signals through the lead wires to processing apparatus.

U.S. Pat. No. 3,899,766, which issued to Mermelstein on Aug. 12, 1975, describes a pressure transducer which includes a pressure fitting, a diaphragm, a strain gage comprising a bridge circuit and tabs with leads for the bridge circuit. It also comprises a termination board. All of these components are contained within a case member. One end of the case is swaged over a flange on the fitting in order to sealingly clamp the diaphragm between a shoulder in the case and the fitting flange. The bridge portion of the strain gage is adhesively secured to the diaphragm.

U.S. Pat. No. 3,505,634, which issued to Von Vick on Apr. 7, 1970, discloses a differential pressure transducer that is adapted for providing an electrical signal indicating the pressure difference between two fluid media. It includes a flexible diaphragm having strain gage elements on its surface within the different fluid media whose pressure difference is to be measured. Positioning of the strain gage elements at the periphery of the diaphragm surfaces provides minimal sensitivity to applied line pressures. Protection from the media is provided by a layer comprising inherit organic material.

U.S. Pat. No. 3,457,536, which issued to Dean et al on Jul. 22, 1969, describes a subminiature pressure transducer that comprises a diaphragm sensing surface with sensors positioned to measure stresses in the diaphragm induced by pressure. The diaphragm is biased by a reference pressure which is applied to a side opposite the test pressure in order to prevent stress reversal in the diaphragm structure.

In an article in the Dec. 4, 1972 issue of Electronics, authors Sias and Hare discuss pressure transducers and the attachment of pressure transducers to circuit boards in an article entitled "Integration Brings a Generation of Low-Cost Transducers." The article discusses pressure transducers which use an all silicon vacuum reference chamber with a Wheatstone bridge arrangement of diffused piezoresistors to measure pressures ranging between zero and one atmosphere.

Elastic connectors, described as the W series, are available from the Fujipoly Corporation for use with electronic circuits and connection between two conductors. These devices provide high accuracy rubber connectors with anisotropic electrical conduction properties by providing between three hundred and two thousand fine metal wires per cubic centimeter embedded in the thickness direction of the transparent silicone rubber sheet. The connectors are inserted between opposite electrodes to provide electrical communication therebetween. The fine metal wires can be gold plated to insure that low resistance requirements can be met along with the ability to withstand relatively high currents. Fujipoly also provides low resistance ZEBRA elastomeric connectors that are constructed of alternating parallel layers of electrically conductive and non-conductive silicon elastomer material. The electrically conductive layers are filled with silver metal particles. The low resistance device provides a redundant connection with a minimum of two conductive layers per contact pad. The connector is available with an insulating barrier or silicon supports. These devices are used for connecting electroluminescent and plasma type displays to printed circuit boards or for connecting hybrid circuits to printed circuit boards. The connectors are positioned between two aligned surfaces and are mechanically clamped together with a lid or other printed circuit board. The connectors may be free standing or positioned in a retainer depending on packaging profiles and design.

In the August 1987 issue of CONNECTION TECHNOLOGY, author Buchoff describes elastomeric connectors in an article titled "Guidelines for Designing Elastomeric Connectors into the System." Also, in the Dec. 7, 1989 edition of EDN, author Mosley describes elastomeric connectors in an article titled "Elastomeric Connectors/meet SMT requirements." Many other articles are available and known to those skilled in the art of electronic circuit design and packaging. The principles of using elastomeric connectors which are selectively conductive in one direction are well known and understood by those skilled in the art. The United States patents and magazine articles discussed above are hereby explicitly incorporated by reference in this application.

In many applications, it is necessary to provide additional circuitry for use in association with a pressure transducer. This circuitry are in addition to the limited components that can be provided directly on the silicon pressure sensor die itself. The additional circuitry can be related to the provision of electromagnetic interference (EMI) protection or the provision of additional capacitors, diodes, trimmable resistors or thermistors which cannot be provided within the structure of the pressure transducer itself. Although silicon pressure transducers typically incorporate amplifier circuitry, piezoresistive components and some trimmable resistors and thermistors on the silicon die with the diaphragm, it is often necessary to provide additional component carriers, such as a printed circuit board, when capacitors and other larger components are necessary for use with the pressure transducer circuit. When this type of combination is necessary, it is common to attach a pressure transducer to a printed circuit board and connect leads from the transducer to components on the circuit board, either by extending leads between the two devices or by soldering leads of the pressure transducer to components or conductors on the printed circuit board. Significant damage can occur during this process because of the need to supply heat to delicate components to accomplish the soldering operation. The potential for damage during the manufacture of this type of device significantly decreases the yield of the finished product. In addition, when soldering is used to make electrical connects between components of this type, later failures can occur during operation if the procedure is not performed with near perfection.

It would therefore be helpful to the field of pressure measurement if a pressure transducer can be efficiently and reliably attached to a component carrier, such as a printed circuit board or a ceramic planar member, without the need for soldering or lead wire connections.

SUMMARY OF THE INVENTION

The present invention provides a pressure transducer which comprises a housing that has an opening therein and a conduit which extends from the opening to a fluid port of the housing. A pressure sensitive device is disposed within the opening of the housing. In a preferred embodiment of the present invention, the pressure sensitive device comprises a silicon die having a diaphragm with at least one piezoresistive component disposed thereon. A seal member is disposed between the pressure sensitive device and a surface of the opening within the housing. The seal member provides fluid communication between the conduit and the pressure sensitive device. A selectively conductive resistent member, such as a conductive elastomeric seal, is disposed in contact with the pressure sensitive device and the pressure sensitive device is disposed between the seal member and the selectively conductive resilient member. It should be understood that selectively conductive resilient members of the type used in the present invention are well known to those skilled in the art. The use of such a resilient member to selectively connect components in electrical communication each other is described in U.S. patent application Ser No. 07/826,206 described above.

In a preferred embodiment of the present invention, a generally planar member, such as a printed circuit board or a ceramic component carrier, is attached to the housing. The seal member, the pressure sensitive device and the selectively conductive resilient member are compressed between the generally planar member and the surface within the opening of the housing. To attach the housing to the generally planar member, the housing is provided with a pair of legs in a preferred embodiment of the present invention. Each of the legs is provided with a bail that attaches to a portion of the generally planar member. The bails on the legs of the housing can be attached through holes in the planar member or to edges of the planar member. The legs are sufficiently flexible to permit them to flex during the attachment of the housing to the planar member and snap back into position after the planar member is attached to the housing. In a particularly preferred embodiment of the present invention, the generally planar member is a ceramic board which comprises numerous electronic components attached thereto. The selectively conductive resilient member is pressed between conductors on the ceramic board and conductors on the pressure sensitive device. The selective conductivity of this resilient member allow electrical communication to be maintained between preselected components of the pressure sensor and of the ceramic board without the need of soldering or attaching leads therebetween.

BRIEF DESCRIPTION OF THE DRAWINGS

The present invention will be more fully understood from a Description of the Preferred Embodiment read in conjunction with the drawings, in which.

DESCRIPTION OF THE PREFERRED EMBODIMENT

Throughout the Description of the Preferred Embodiment, like components will be identified with like reference numerals.

Figures 1, 3:
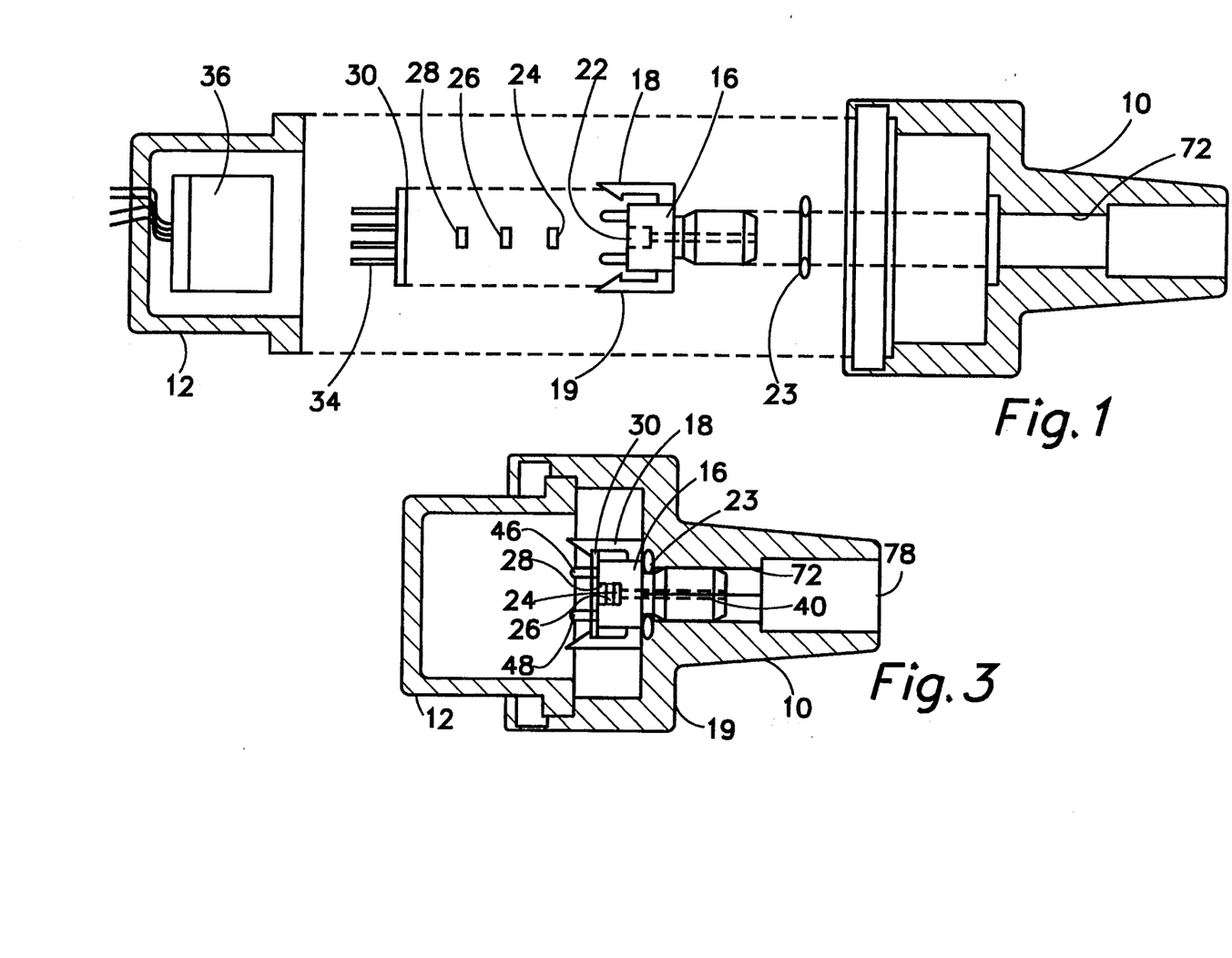
FIG. 1 shows an exploded view of one embodiment of the present invention.
FIG. 3 shows an assembled view of the exploded illustration of FIG. 1.

FIG. 1 shows an exploded view of one particularly preferred embodiment of the present invention. Although the pressure transducer shown in FIG. 1 is illustrated in conjunction with a outer containment 10 and a cap 12, it should be understood that the primary concept of the present invention is related to the transducer assembly contained within the cap and housing. The pressure transducer of the present invention, which is disposed within the outer containment 10, comprises the housing 16 which has legs 18 and 19. As will be described in greater detail below, the housing 16 is provided with an opening 22 which is shaped to receive a media seal 24, a pressure sensor die 26 and a conductive seal 28. The legs, 18 and 19, of the housing 16 are shaped to permit the attachment of a generally planar member 30 to the housing 16 in such a way that the media seal and the conductive seal are compressed between the planar member 30 and an inner surface of opening 22, with the pressure sensor die 26 being compressed between the two seals, 24 and 28. In the embodiment of the present invention illustrated in FIG. 1, the generally planar member 30 is a thick film ceramic circuit with a plurality of terminals 34 extending from the ceramic circuit. A connector 36 is shown disposed within the cap 12. It should be understood that the connector 36 has a plurality of openings therein (not shown in FIG. 1) that are shaped to receive the terminals 34.

Figure 2:
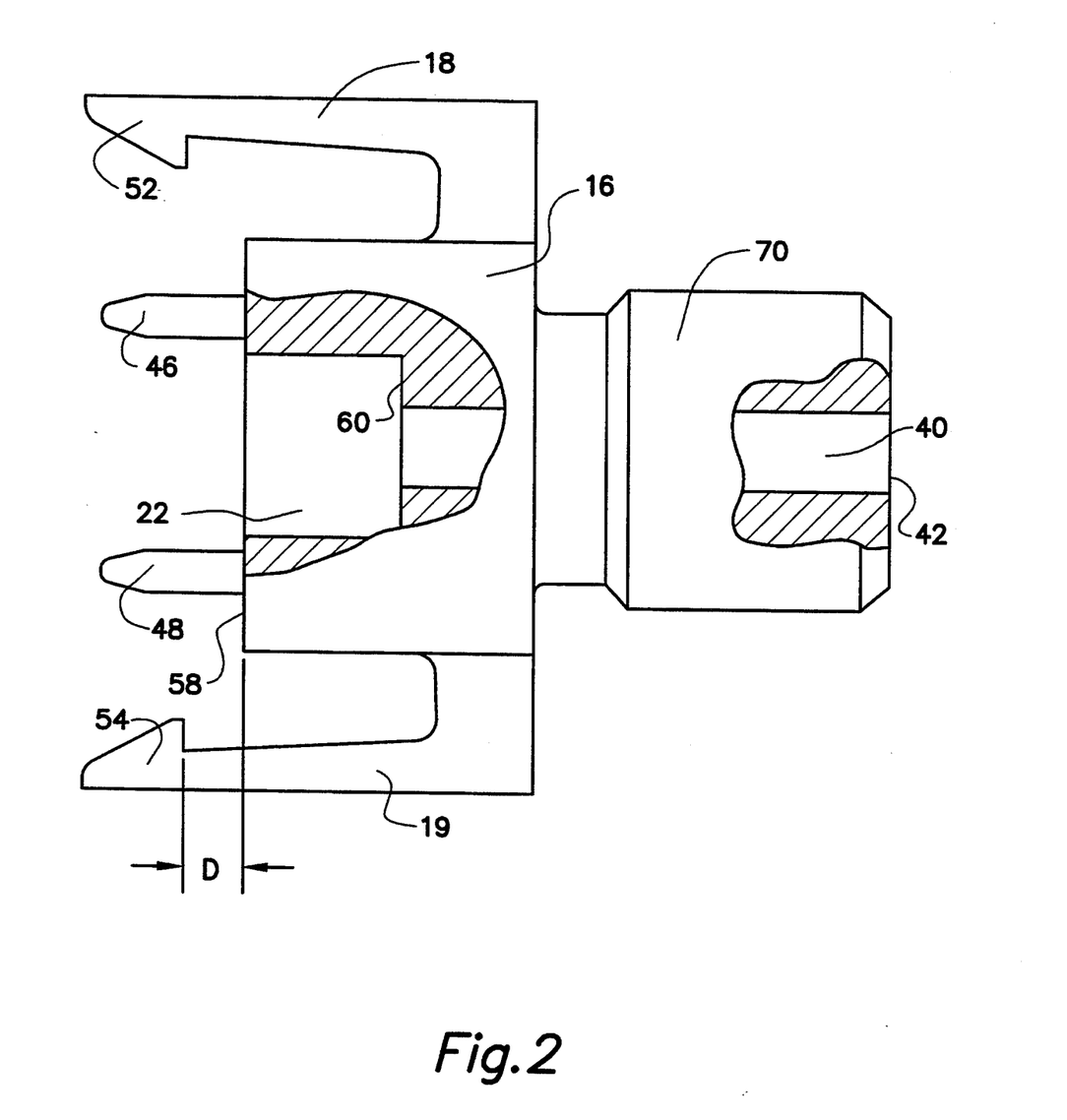
FIG. 2 shows a sectioned view of a housing member of the present invention.

FIG. 2 shows a sectioned view of the housing 16. The sectioned portions of the housing 16 illustrate a conduit 40 that connects the opening 22 in fluid communication with an inlet port 42. In the embodiment shown in FIG. 2, the opening 22 is shaped to receive the media seal 24, the pressure sensor die 26 and the conductive seal 28 (shown in FIG. 1) within it.

With continued reference to FIGS. 1 and 2, the alignment pins, 46 and 48, are used to provide proper alignment with the generally planar member 30 as will be described in greater detail below. The first and second legs, 18 and 19, of the housing 16 are provided with bails, 52 and 54, respectively. The bails are each provided with a step which is shaped to seize a portion of the generally planar member 30. The distance between the step and surface 58 is identified by reference letter D in FIG. 2. When the generally planar member 30, such as a ceramic circuit board, is disposed between surface 58 and the steps of the two legs, 18 and 19, it is captured by the steps when the legs snap back into position after temporarily flexing to permit the ceramic circuit board to be disposed against surface 58. The depth of opening 22 is selected to be slightly less than that combined thicknesses of the media seal 24, pressure sensor die 26 and conductive seal 28. In an uncompressed state, these three components will extend beyond surface 58 when the media seal 24 is disposed against surface 60 and the pressure sensor die 26 and conductive seal 28 are disposed in the opening 22 with the pressure sensor die disposed between the two seals. When the generally planar member 30 is disposed between the steps of legs, 18 and 19, and surface 58, the surface of the generally planar member facing surface 58 will exert a compressive force against the conductive seal 28. When the steps of legs, 18 and 19, snap into position relative to the generally planar member, the compressive force will be continually exerted and will maintain a sealing association between surface 60 and the media seal 24 and between the pressure sensor die 26 and the media seal 24. In addition, the compressive force will provide appropriate pressure between the pressure sensor die 26 and the conductive seal 28 to maintain electrical communication between conductive components on the pressure sensor die and conductive elements on the generally planar member 30.

Although it should be understood that the housing 16 in FIG. 2 can be associated with many different types of components within the scope of the present invention, the embodiment shown in FIG. 2 comprises a housing extension portion 70 that is shaped to be received in opening 72 which is illustrated in FIG. 1. The connection between the housing portion 70 and opening 72 can be accomplished through the use of an adhesive or by threading both members, 70 and 72, and attaching them in mesh relation with each other. Between the housing 16 and the outer containment 10 is a sealing means, such as O-ring 23 which provides a fluid seal therebetween.

FIG. 3 shows the embodiment of FIG. 1 in an assembled condition. The generally planar member 30 is disposed between the bails of legs 18 and 19 and surface 58 of the housing 16. The alignment pins, 46 and 48 are shown extending through the generally planar member 30. Within the housing 16, the media seal 24, the pressure sensor die 26 and the conductive seal 28 are illustrated by dashed lines within the opening 22 of the housing. Also shown in FIG. 3 is the conduit 40 which provides fluid communication between the pressure sensor die 26 and a portion 78 of the outer containment 10. The connector 36 of FIG. 1 and the terminals 34 of FIG. 1 are not illustrated in FIG. 3. It can be seen that the generally planar member 30 provides a compressive force between one of its surfaces and an inner surface (reference numeral 60 in FIG. 2) of opening 22.

Figure 4:
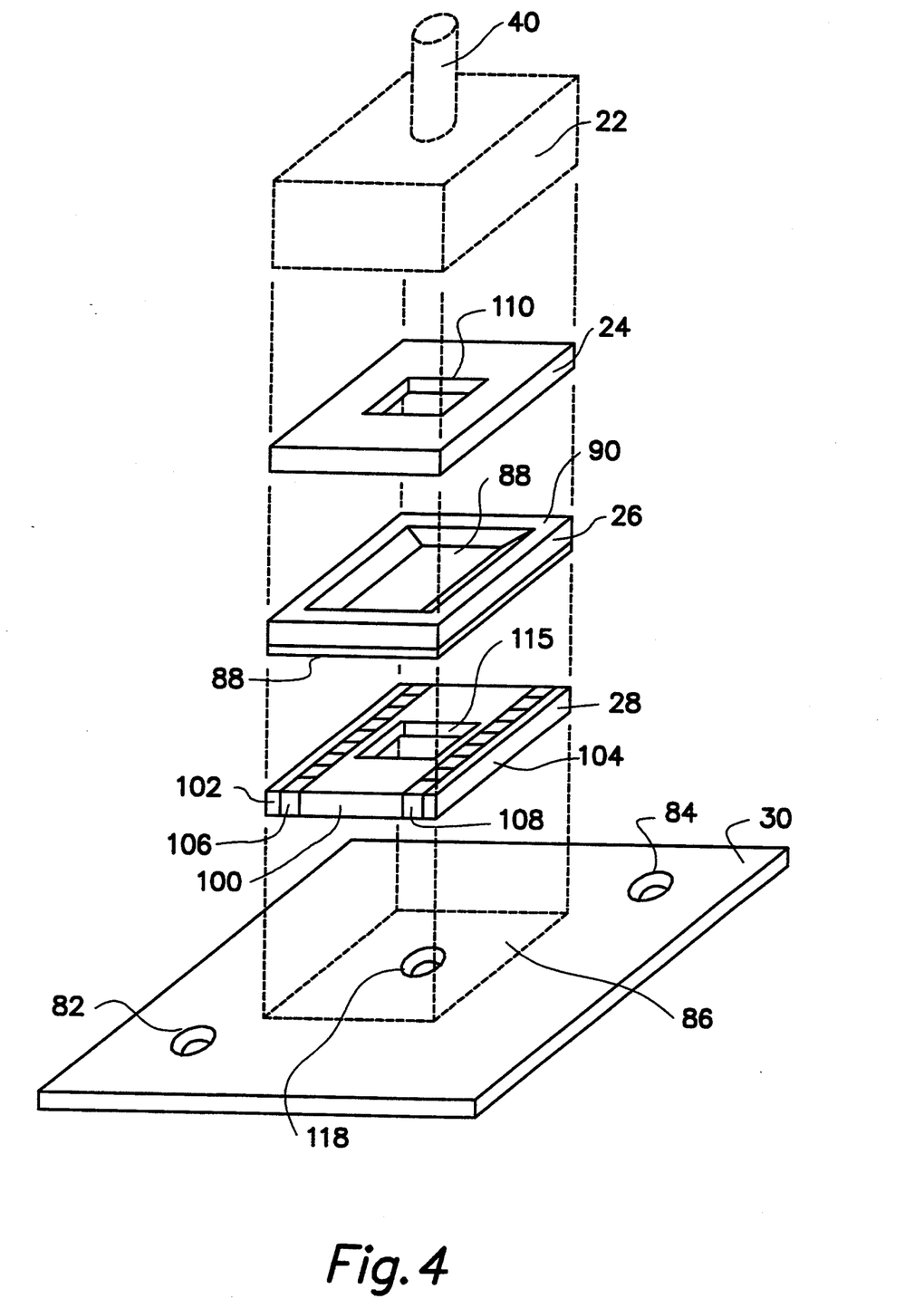
FIG. 4 shows a detailed and exploded view of the sealing and pressuring measuring components of the present invention.

FIG. 4 shows a more detailed illustration, as an exploded view, of the seals, the pressure sensor die 26 and the generally planar member 30. It should be understood that the relative dimensions of components in FIG. 4 are not precise and not intended to accurately reflect the actual sizes of the components. Instead, the members shown in FIG. 4 are illustrated to demonstrate their relative positions and the interaction been the elements. The generally planar member 30 comprises holes, 82 and 84, which are shaped and positioned to receive the alignment pins, 46 and 48, of the housing therethrough as described above in relation to FIG. 3. The upper surface of the generally planar member 30 comprises a region 86 that is illustrated as a dashed line rectangle. Although no conductive members are shown on the upper surface of the generally planar member, it should be understood that, within region 86, several conductive pads are disposed and, outside of region 86, several electronic or electrical components located. Conductive pads disposed within region 86 are intended to be connected in electrical communication with electronic components on the lower surface of the pressure sensor die 26. Although not shown in the illustration of FIG. 4, it should be understood that the pressure sensor die is usually provided with a plurality of electronic components, such as piezoresistive elements, on its lower surface as is well known by those skilled in the art. These piezoresistive components are generally disposed in stress communicating relation with the diaphragm 88 which is attached to the lower surface of a silicon substrate 90 that is partially etched to reveal the diaphragm 88. Although the present invention does not rely on the use of a particular type of pressure sensitive device, one type of pressure transducer that is particularly well suited for use with the present invention is one that incorporates a silicon substrate 90 with a layer of silicon dioxide disposed on one surface of the substrate. After a back-etching operation is performed through the other surface, the diaphragm 88 is exposed. The diaphragm 88 shown in FIG. 4 is the silicon dioxide layer disposed on the opposite surface of the substrate. When the diaphragm 88 flexes in response to pressure changes thereon, the piezoresistive elements are also distorted. By arranging the piezoresistive components in a bridge circuit configuration, changes in their resistance as a result of the stresses imposed on them can be sensed and the pressure imposed on the diaphragm can thus be determined. Disposed between the pressure sensor die 26 and region 86 of the generally planar member 30, is a conductive seal 28 that is selectively conductive and resilient. In one particularly preferred embodiment of the present invention, the conductive seal 28 comprises a nonconductive central portion 100 and nonconductive outer portions 102 and 104. Between the nonconductive portions of the seal, selectively conductive strips, 106 and 108 are disposed. Alternating elements within the selectively conductive strips, 106 and 108, are disposed with alternate elements being conductive and the other elements being nonconductive (shown as stripes in FIG. 4). As is well known to those skilled in the art, the selectively conductive strips, 106 and 108, are available in commercial quantities from several suppliers, such as Fujipoly and PCK Elastomerics, and have been gaining wide acceptance by circuit designers in recent years. The selectively conductive strips, 106 and 108, are disposed immediately above and in electrical contact with conductive pads within region 86. In addition, the selectively conductive strips, 106 and 108, of the conductive seal 28 are disposed immediately below and in electrical contact with conductive portions of a circuit disposed on the underside of the pressure sensor die 26.

With continued reference to FIG. 4, a media seal 24 is disposed on the upper surface of the pressure sensor die 26. The opening 22, which is described above and illustrated in FIGS. 1 and 2, is represented by dashed lines in FIG. 4 to show the relative location of opening 22 with respect to the other components of the present invention. In addition, conduit 40 is also shown by dashed line in FIG. 4. The media seal 24 has a central opening 110 that is located in fluid communication with conduit 40. Central opening 110 is also disposed at a location which places is in fluid communication with the diaphragm 88 of the pressure sensor die 26. Therefore, pressure within conduit 40 is transmitted, through central opening 110, to the diaphragm of the pressure sensor die and reflected in the output from the components on the under side of the pressure die. A central opening 115 of the conductive seal 28 is disposed proximate the lower surface of diaphragm 88. In addition, a hole 118 through the generally planar member 30 is aligned with the central opening 115 so that the underside of diaphragm 88 is in fluid communication with the environment at the under side of generally planar member 30. As will be described in greater detail below, the underside of the diaphragm 88 can be disposed in fluid communication with atmospheric pressure or with the pressure of another fluid so that the device shown in FIG. 4 can measure either absolute pressure or differential pressure. It can be seen that the elements of the present invention are arranged so that they can be compressed between the upper surface of the generally planar member 30 and surface 60 (not shown in FIG. 4) of opening 22. This compressive force not only provides a fluid seal between the pressure sensor die 26 and the surface 60 but, in addition, it provides electrical communication between the electronic components on the underside of the pressure sensor die 26 and conductive pads within region 86.

Figure 5:
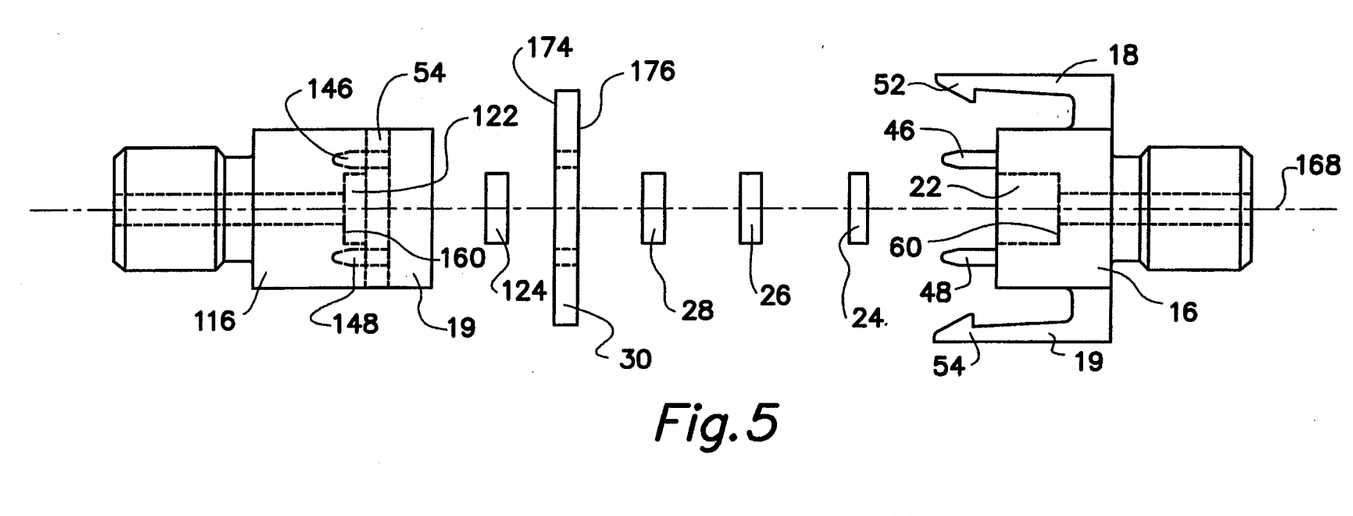
FIG. 5 shows an alternative embodiment of the present invention in exploded view.

The embodiment of the present invention illustrated in FIGS. 1, 2 and 3 represents an application in which a pressure within conduit 40 is measured relative to ambient pressure. The bottom side of planar member 30 in FIG. 4, proximate hole 118, provides the pressure imposed on the lower side of diaphragm 88. Therefore, the pressure within conduit 40 is exerted against the upper side of diaphragm 88 and the net effect on the diaphragm is determined by the relative pressures on its opposite sides. It should be understood, however, that the present invention is also suitable for us in a differential pressure transducer in which the relative magnitudes of pressures in two conduits are compared when the difference is measured. FIG. 5 shows an example of this alternate type of application. It should be understood that housing 16 and housing 116 in FIG. 5 are identical to each other except for the presence of alignment pins, 46 and 48 on housing 16, but not housing 116. In addition, housing 116 is provided with depressions, 146 and 148, which are shaped to receive the alignment pins when the two housings are attached together. The configuration of the housings, 16 and 116, shown in FIG. 5 are essentially identical to the housing 16 described above and illustrated in FIGS. 1, 2 and 3. Therefore, the components of the housing will not be described herein.

Between housings 16 and 116 in FIG. 5, a generally planar member 30 is associated with a media seal 24, a pressure sensor die 26 and a conductive seal 28 in a manner identical to that described above in conjunction with FIGS. 1 and 4. The legs of housing 16 comprise bails with steps that are configured to seize the generally planar member 30, which can be a ceramic circuit board. Housing 116 is rotated about centerline 168 by 90 degrees. Between housing 116 and the generally planar member 30 a second media seal 124 is disposed. It can be seen in FIG. 5 that the depth of opening 122 of housing 116 is less than the depth of opening 22 of housing 16. Opening 122 is shaped to receive the media seal 124 in compressive relation between one of its surfaces 160 and a surface 174 of the generally planar member 30. The two housings, 16 and 116, are rotated relative to each other to allow their respective legs to attach to edges of the generally planar member 30 without interfering with each other. This permits the pressure sensor die 26 and its associated media seal 24 and conductive seal 28 to be compressed between another surface 176 of the generally planar member and surface 60 of opening 22.

Figure 6:
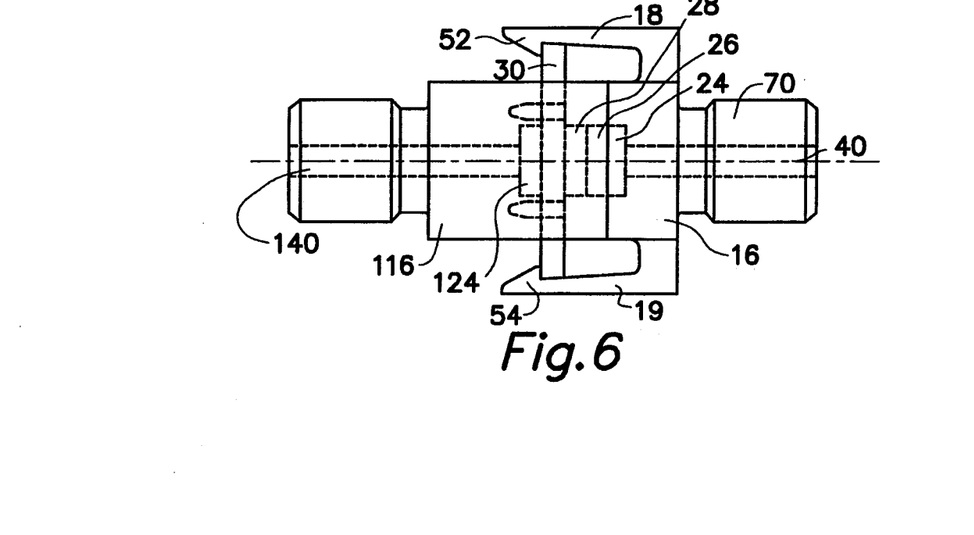
FIG. 6 shows an assembled view of the device illustrated in FIG. 5.

When the components in FIG. 5 are assembled and the bails of the legs are snapped over edges of the generally planar member 30, the assembled device appears as is shown in FIG. 6. The generally planar member 30, or ceramic board, is rigidly attached between housing 16 and 116 with the pressure sensor die 26 disposed in electrical communication with one surface of the ceramic board because of the selective conductivity of the conductive seal 28. On the other side of the ceramic board, media seal 124 provides fluid sealing between conduit 140 of housing 116 and the ceramic board. The arrangement shown in FIG. 6 illustrates an embodiment of the present invention which provides a measurement of the differential pressure between the pressure in conduit 40 and the pressure in conduit 140. Although not shown in FIG. 6, the generally planar member 30 would be provided with leads that are connectable to an external device so that power can be provided to the components on the generally planar member 30 and signals can be transmitted from those components to external equipment. The precise circuitry contained on the ceramic board and the particular location of the leads are not critical to the concept of the present invention and are therefore not illustrated.

Figure 7A:
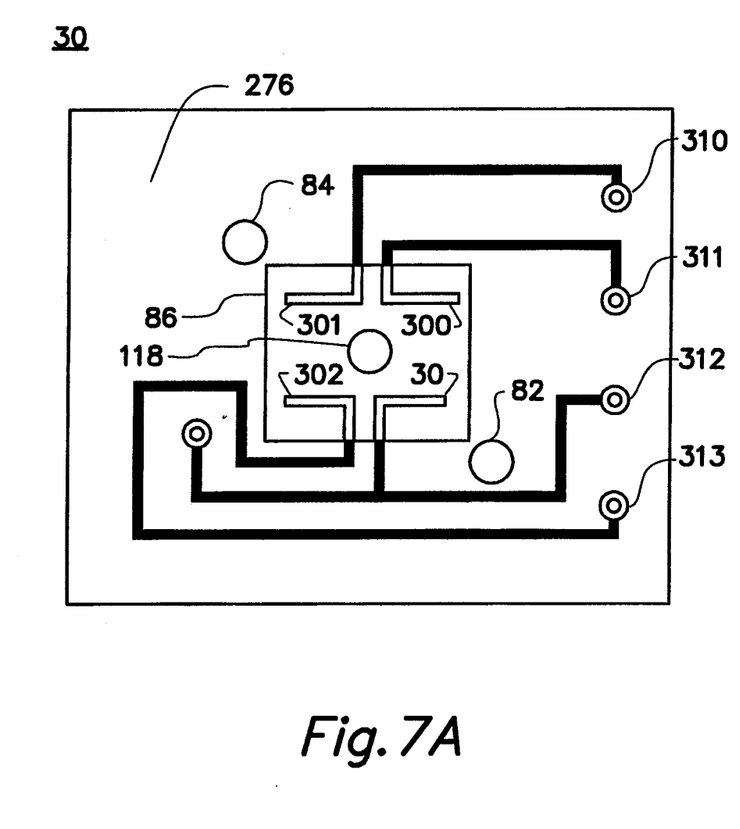
FIGS. 7A and 7B show opposite sides of the generally planar member of the present invention for one particular embodiment thereof.
Figure 7B:
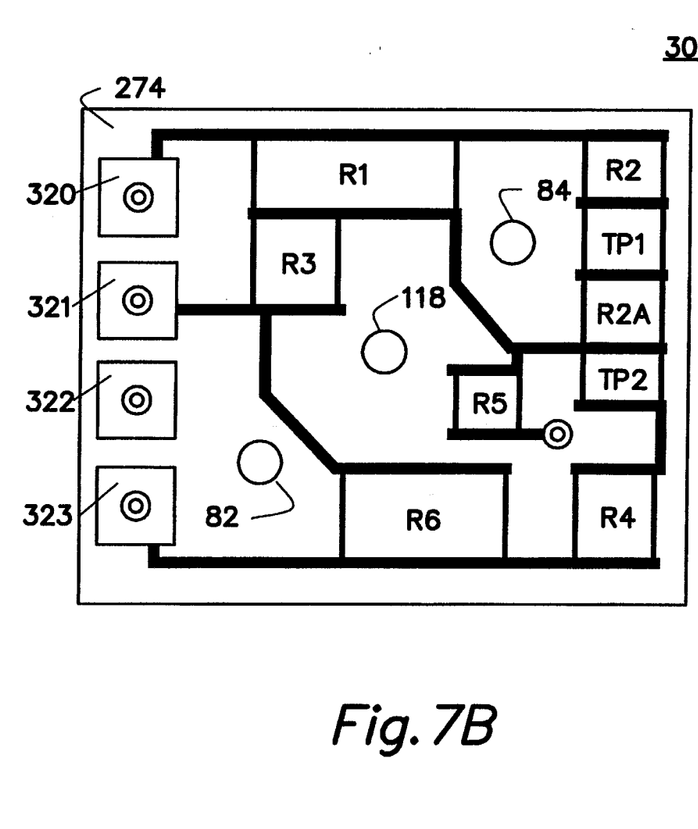

FIGS. 7A and 7B show opposite sides of the generally planar member 30, or ceramic circuit board. With reference to FIG. 7A, it can be seen that the central hole 118 and the alignment holes, 82 and 84, extend through the generally planar member 30. In the central portion of side 276 shown in FIG. 7A, region 86 is illustrated with four conductive pads disposed therein. For purposes of this discussion, the conductive pads are identified by reference numerals 300, 301, 302 and 303. Also illustrated in FIG. 7A are a plurality of conductive runs such as those which are well known to those skilled in the art. The runs connect the conductive pads in region 86 to vias 310, 311, 312 and 313.

FIG. 7B shows the other side 274 of the generally planar member 30. Conductive pads 320, 321, 322 and 323 are connected in electrical communication with the vias from the opposite side 276. To illustrate an exemplary circuit on side 274, resistors R1, R2, R3, R4, R5, R6 and R2A are shown connected in electrical communication between preselected conductive runs. In addition, test points TP1 and TP2 are illustrated. Although only resistors are illustrated on side 274, it should clearly be understood that other types of electronic components, both integral and discrete, can be included in the circuit attached to side 274 of generally planar member 30.

The present invention provides a means by which a pressure sensor die can be connected to a circuit board without the need for either soldering or the connection of electrical leads between components on the pressure sensor die and components on the circuit board. Although the present invention has been described in significant detail and illustrated with explicit detail of certain particularly preferred embodiments of the present invention, it should be understood that the present invention is not limited to those embodiments and, in turn, many other embodiments are within its scope.

The embodiments of the invention which an exclusive property or right is claimed are defined as follows:

1. A pressure transducer, comprising:
   a housing having an opening therein and a conduit extending from said opening to a fluid port of said housing;
   a pressure sensitive device disposed in said opening;
   a seal member disposed between said pressure sensitive device and a surface of said opening, said seal member providing fluid communication between said conduit and said pressure sensitive device;
   a selectively conductive resilient member disposed in contact with said pressure sensitive device, said selectively conductive resilient member being disposed in electrical communication with at least one conductive element on said pressure sensitive device, said pressure sensitive device being disposed between said seal member and said selectively conductive resilient member;
   a generally planar member attached to said housing, said seal member, said pressure sensitive device and said selectively conductive resilient member being compressed between said generally planar member and said surface of said opening, said selectively conductive resilient member being disposed in electrical communication with at least one conductive element on said generally planar member; and
   means for attaching said housing to said generally planar member and compress said, pressure sensitive device, said selectively conductive resilient member and said seal member therebetween.

2. The transducer of claim 1, wherein:
said housing comprises a pair of legs shaped to hold said housing against said generally planar member, said attaching means comprising said pair of legs.

3. The transducer of claim 2, wherein:
each one of said pair of legs comprises a bail, the flexibility of each one of said pair of legs being sufficient to captive a portion of said generally planar member between said pair of legs.

4. The transducer of claim 3, further comprising:
a plurality of electronic components attached to said generally planar member.

5. The transducer of claim 1, wherein:
said pressure sensitive device comprises a diaphragm that is movably responsive to the pressure within said conduit.

6. The transducer of claim 1, wherein:
said conductive resilient member provides electrical communication between preselected electronic components of said pressure sensitive device and preselected electronic components of said generally planar member.

7. The transducer of claim 1, wherein:
said selectively conductive elastomeric seal is linearly conductive in one direction therethrough.

8. A pressure transducer, comprising:
   a housing having a conduit extending between a port of said housing and a surface of said housing;
   a pressure sensitive device;
   a seal member disposed between said pressure sensitive device and said surface of said housing;
   a selectively conductive member disposed in electrical communication with electronic components of said pressure sensitive device, said pressure sensitive device being disposed between said seal member and said selectively conductive member; and
   a component carrier attached to said housing, said selectively conductive member being disposed in electrical communication with components connected to said component carrier, said seal member, said pressure sensitive device and said selectively conductive member being compressed between said surface of said housing and said component carrier, said housing comprising means for holding said component carrier against said selectively conductive member, said selectively conductive member being disposed in electrical communication between said electronic components of said pressure sensitive device and electronic components of said component carrier.

9. The transducer of claim 8, wherein:
said pressure sensitive device comprises a diaphragm and at least one piezoresistive component, said diaphragm being disposed in fluid communication with said conduit.

10. The transducer of claim 8, wherein:
said holding means comprises a plurality of generally flexible legs, each of said legs comprising a bail shaped to seize a portion of said component carrier.

11. The transducer of claim 10, wherein:

said component carrier comprises a plurality of holes, each of said holes being shaped to receive said bail of a preselected one of said plurality of said generally flexible legs.

12. The transducer of claim 10, wherein:
each of said plurality of generally flexible legs is attached to an edge of said component carrier.

13. The transducer of claim 8, wherein:
said component carrier is a generally planar ceramic component.

14. The transducer of claim 8, further comprising:
a second housing, a second pressure sensitive device, a second seal member and a second selectively conductive member similarly arranged on an opposite side of said component carrier.

15. A pressure transducer, comprising:
a housing having an opening therein and a conduit extending from said opening to an inlet port of said housing;
a pressure sensitive device;
a media seal disposed between a surface of said opening and said pressure sensitive device;
an elastomeric conductor disposed in electrical communication with said pressure sensitive device;
a component carrier attached to said housing, said pressure sensitive device, said media seal and said elastomeric conductor being disposed between said component carrier and said surface of said opening; and
means, disposed on said housing and shaped to cooperate with said component carrier, for compressing said media seal, said elastomeric conductor and said pressure sensitive device between said component carrier and said housing.

16. The transducer of claim 15, wherein:
said pressure sensitive device comprises a silicon substrate and a silicon dioxide diaphragm.

17. The transducer of claim 16 wherein:
said diaphragm comprises a plurality of electronic components disposed thereon.

* * * * *